Aug. 27, 1963  L. LIENARD  3,101,570
DEVICE FOR HUMIDIFYING AND FERTILIZING THE GROUND
Filed June 29, 1961  2 Sheets-Sheet 1
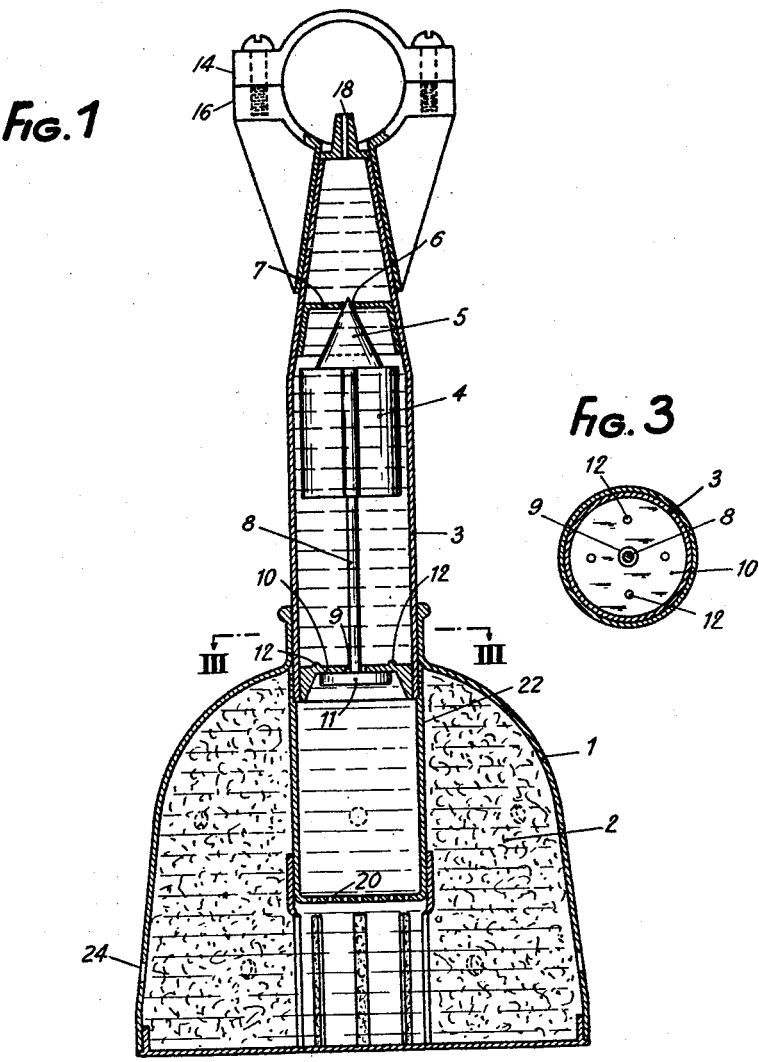
Inventor
Léonce Lienard
By Ooms, McDougall & Hersh
atty.

Aug. 27, 1963   L. LIENARD   3,101,570
DEVICE FOR HUMIDIFYING AND FERTILIZING THE GROUND
Filed June 29, 1961   2 Sheets-Sheet 2
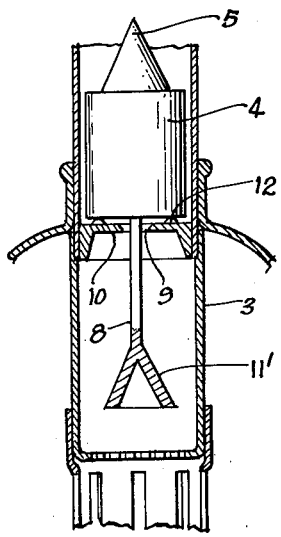
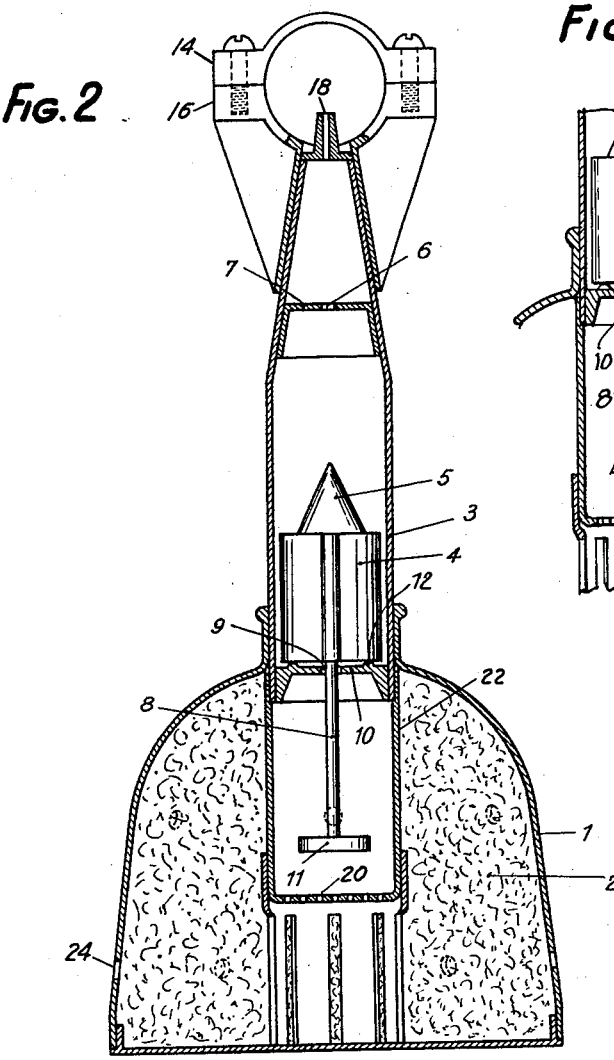
Inventor
Léonce Lienard
By
Ooms, McDougall & Hersh
atty.

United States Patent Office 3,101,570
Patented Aug. 27, 1963

3,101,570
DEVICE FOR HUMIDIFYING AND FERTILIZING THE GROUND
Léonce Lienard, Pepinieres Sainte-Therese, Bazainville, France
Filed June 29, 1961, Ser. No. 120,661
Claims priority, application France May 4, 1961
2 Claims. (Cl. 47—48.5)

The present invention relates to devices for humidifying and fertilizing the ground constituted of a rose meant to be hidden in the ground, containing a filtering body, and within which there is located a delivery pipe for the passage of liquid (water or fertilizing solution), said pipe involving means for the automatic control of the output of the liquid, substantially constituted of a float provided with a needle apt to obturate an opening for the flow of the liquid into the pipe.

One object of this invention is to provide a device of this type involving improved means for the automatic control of the output of the liquid.

Another object of the invention is to provide a device of this improved type suitable to be used alternatively for injecting air or gas into the ground.

The invention will be described with reference to an embodiment given by way of example and shown in the annexed drawings in which:

FIGS. 1 and 2 are vertical sectional views through the device showing respectively the control means for the output of the liquid in their both end positions, FIG. 3 is a sectional detail view along line III—III of FIG. 1, and FIG. 4 is a detail vertical sectional view of an alternative form of the invention.

The device includes, in a known way, a rose 1 containing a filtering body 2, and delivery pipe 3 for the liquid, within which is located a float 4 involving at its upper part a needle 5 which, when the rose and the pipe are full of water due to the saturation of the earth with humidity, obturates an opening 6 provided in a transverse wall 7 in the pipe for the passage of the liquid (FIG. 1).

According to the invention, the float 4 is secured by its lower part to the upper end of a rod 8 passing freely through another opening 9 for the flow of liquid provided in another transverse wall 10 in the pipe 3, said rod 8 involving at its lower end a valve 11 which obturates said opening 9 when, in aforesaid conditions, the float is in its high position, so that the pipe is then choked at two points instead of one. The device includes clamp members 14 and 16 which provide means for connecting the device to a pipe whereby liquid can be delivered through passage 18. After passage through openings 6 and 9, liquid travels through the openings 20 in the cylinder 22 and then outwardly through openings 24 defined by the rose 1.

When the rose and the pipe are empty of liquid (FIG. 2), the float 4 falls onto the wall 10 but the latter, according to the invention, bears on its upper side projections 12 (see also FIG. 3) so that the float, resting on said projections, does not obturate the opening 9 and it is possible, under such conditions, to use the device to blow air or a gas into the ground through pipe 3, through the openings 6 and 9 and the rose 1.

FIG. 4 illustrates an alternative form of the instant invention. In the structure illustrated, the same numerals have been applied to elements corresponding to the structure shown in FIGS. 1 and 2. However, the valve 11' in this instance comprises an inverted cone-like member which is effective to seal off the opening 9 when the float 4 is in its elevated position. As in the other structures, this positioning of the float provides for a double seal in the device.

While a particular embodiment of this invention has been illustrated and described herein, it is intended that this invention be not limited to such disclosure, and changes and modifications can be made and incorporated within the scope of the claims.

I claim:

1. A device for humidifying and fertilizing the ground, including a rose and a delivery pipe opening into said rose whereby liquid can pass therebetween, a float located in said pipe involving at its upper part a needle apt to obturate an opening for the liquid flow, provided in a transverse wall in the pipe, said float being secured by its lower part to the upper end of a rod passing freely through another opening for the flow of liquid provided in another transverse wall in the pipe, said rod involving at its lower end a valve which obturates said other opening when the float is in its high position.

2. A device for humidifying and fertilizing the ground, including a rose and a delivery pipe opening into said rose whereby liquid can pass therebetween, a float located in said pipe involving at its upper part a needle apt to obturate an opening for the liquid flow, provided in a transverse wall in the pipe, said float being secured by its lower part to the upper end of a rod passing freely through another opening for the flow of liquid provided in another transverse wall in the pipe, said rod involving at its lower end a valve which obturates said other opening when the float is in its high position, and said wall presenting on its upper side projections on which the float rests when in low position in order to prevent said float from obturating then said other opening.

References Cited in the file of this patent

UNITED STATES PATENTS

| | | |
|---|---|---|
| 1,204,324 | Sprague | Nov. 7, 1916 |
| 2,619,116 | Ralston | Nov. 25, 1952 |
| 2,691,386 | Madison | Oct. 12, 1954 |
| 2,789,013 | Bletcher | Apr. 16, 1957 |

FOREIGN PATENTS

| | | |
|---|---|---|
| 1,212,409 | France | Oct. 19, 1959 |
| 1,232,981 | France | May 2, 1960 |